United States Patent
Snyder, II et al.

(10) Patent No.: US 9,363,193 B2
(45) Date of Patent: Jun. 7, 2016

(54) VIRTUALIZED NETWORK INTERFACE FOR TCP REASSEMBLY BUFFER ALLOCATION

(71) Applicant: Cavium, Inc., San Jose, CA (US)

(72) Inventors: Wilson Parkhurst Snyder, II, Holliston, MA (US); Carl Richard Gyllenhammer, Northborough, MA (US)

(73) Assignee: Cavium, Inc., San Jose, CA (US)

( * ) Notice: Subject to any disclaimer, the term of this patent is extended or adjusted under 35 U.S.C. 154(b) by 289 days.

(21) Appl. No.: 14/083,894

(22) Filed: Nov. 19, 2013

(65) Prior Publication Data

US 2015/0142977 A1     May 21, 2015

(51) Int. Cl.
*H04L 12/911* (2013.01)
*H04L 29/12* (2006.01)

(52) U.S. Cl.
CPC .............. *H04L 47/70* (2013.01); *H04L 47/72* (2013.01); *H04L 61/103* (2013.01)

(58) Field of Classification Search
CPC ........ H04L 47/70; H04L 47/72; H04L 61/103
See application file for complete search history.

(56) References Cited

U.S. PATENT DOCUMENTS

| | | | | |
|---|---|---|---|---|
| 6,714,985 B1 * | 3/2004 | Malagrino | ........... | H04L 29/06 370/394 |
| 7,171,495 B2 * | 1/2007 | Matters | ........... | H04L 69/324 709/212 |
| 7,245,627 B2 * | 7/2007 | Goldenberg | ........... | H04L 47/10 370/419 |
| 7,478,173 B1 * | 1/2009 | Delco | ........... | H04L 12/2865 709/250 |
| 7,499,457 B1 * | 3/2009 | Droux | ........... | H04L 47/10 370/395.7 |
| 8,194,667 B2 * | 6/2012 | Belgaied | ........... | H04L 49/90 370/392 |
| 8,667,187 B2 * | 3/2014 | Thakkar | ........... | G06F 13/28 710/22 |
| 8,683,000 B1 * | 3/2014 | Schlansker | ........... | H04L 47/39 709/212 |
| 8,868,672 B2 * | 10/2014 | Hummel | ........... | H04L 67/2833 709/212 |
| 8,874,786 B2 * | 10/2014 | Domsch | ........... | G06F 9/45558 709/238 |

(Continued)

OTHER PUBLICATIONS

Willmann, Paul, et al. "Concurrent direct network access for virtual machine monitors." High Performance Computer Architecture, 2007. HPCA 2007. IEEE 13th International Symposium on. IEEE, 2007.*

(Continued)

*Primary Examiner* — Jimmy H Tran
(74) *Attorney, Agent, or Firm* — pkalousek.ip (57) ABSTRACT

A method and a system embodying the method for dynamically allocating context for Transmission Control Protocol (TCP) reassembly, comprising providing a fixed plurality of global common TCP contexts; reserving for each of one or more virtual network interface card(s) one or more TCP context(s) out of the fixed plurality of the global common TCP contexts; and allocating to a virtual network interface card from the one or more virtual network interface card(s) a TCP context from the reserved one or more TCP contexts when a reassemble able TCP packet is received by the virtual network interface card, is disclosed.

21 Claims, 4 Drawing Sheets

(56) References Cited

U.S. PATENT DOCUMENTS

| | | | |
|---|---|---|---|
| 2002/0143842 A1* | 10/2002 | Cota-Robles | G06F 9/45558 718/1 |
| 2006/0274787 A1* | 12/2006 | Pong | G06F 12/0875 370/469 |
| 2006/0274788 A1* | 12/2006 | Pong | H04L 69/165 370/469 |
| 2008/0240142 A1* | 10/2008 | Belgaied | H04L 49/90 370/420 |
| 2008/0256247 A1* | 10/2008 | Mangin | H04L 63/1458 709/228 |
| 2009/0307363 A1* | 12/2009 | Zhou | G06F 12/1081 709/230 |
| 2010/0070677 A1* | 3/2010 | Thakkar | G06F 13/28 711/6 |
| 2012/0287944 A1 | 11/2012 | Pandlt et al. | |
| 2013/0061047 A1 | 3/2013 | Sridharan et al. | |
| 2013/0104127 A1* | 4/2013 | Domsch | G06F 9/45558 718/1 |
| 2013/0117426 A1* | 5/2013 | Saraiya | G06F 13/387 709/222 |
| 2013/0138836 A1* | 5/2013 | Cohen | H04L 49/351 709/250 |
| 2013/0304841 A1* | 11/2013 | Hummel | G06F 15/1735 709/212 |
| 2014/0219287 A1* | 8/2014 | Birke | H04L 47/621 370/412 |
| 2015/0020073 A1* | 1/2015 | Domsch | G06F 9/45558 718/1 |
| 2015/0085665 A1* | 3/2015 | Kompella | H04L 47/2483 370/236 |
| 2015/0089500 A1* | 3/2015 | Kompella | H04L 43/18 718/1 |

OTHER PUBLICATIONS

Singh, Rajvikram, et al. "Real-time multi-scale brain data acquisition, assembly, and analysis using an end-to-end OptIPuter." Future Generation Computer Systems 22.8 (2006): 1032-1039.*

Dharmapurikar, Sarang, and Vern Paxson. "Robust TCP Stream Reassembly in the Presence of Adversaries." USENIX Security. 2005.*

Raj, Himanshu, and Karsten Schwan. "High performance and scalable I/O virtualization via self-virtualized devices." Proceedings of the 16th international symposium on High performance distributed computing. ACM, 2007.*

Non-published U.S. Appl. No. 14/038,156. first-named inventor: Bryan W. Chin, filed Sep. 26, 2013.

Non-published U.S. Appl. No. 13/951,334. first-named inventor: Muhammad Raghib Hussain, filed Jul. 25, 2013.

Non-published U.S. Appl. No. 14/037,245. first-named inventor: Wilson P. Snyder II, filed Sep. 25, 2013.

* cited by examiner

VIRTUALIZED NETWORK INTERFACE FOR TCP REASSEMBLY BUFFER ALLOCATION

BACKGROUND

1. Field

The present disclosure relates to communications in computer networks. More particularly, this invention is directed toward a virtualized network interface for Transfer Control Protocol (TCP) reassembly buffer allocation.

2. Description of Related Technology

In computer systems, virtualization is a process by which a virtual version of computing resources, such as hardware and software resources, i.e., a central processor unit, a storage system, an input/output resources, a network resource, an operating system, and other resources known in the art, are simulated by a computer system, referred to as a host machine. A typical host machine may comprise a hardware platform that optionally together with a software entity i.e., an operating system, operates a hypervisor, which is software or firmware that creates and operates virtual machines, also referred to as guest machines. Through hardware virtualization, the hypervisor provides each virtual machine with a virtual hardware operating platform. By interfacing with the virtual hardware operating platform, the virtual machines access the computing resources of the host machine to execute virtual machines' respective operations. As a result, a single host machine can support multiple virtual machines, each operating an operating system and/or other software entity, i.e., an application, simultaneously through virtualization.

In a typical host machine, the virtual hardware operating platform should be presented to the virtual machines in a manner that assures that the virtual nature of the hardware platform should not be discernible to the virtual machines. Consequently, the host machine should avoid conflicts between virtual machines in accessing the computing resources. To accomplish these goals, the host machine may implement a translation scheme between the virtual machines' software and the host machine's resources. With regard to accessing network resources, for example, the host machine may support virtual network interface that are presented to respective virtual machines. The virtual network interface Virtual Network Interface Card (VNIC) appears to the virtual machine as a physical Network Interface Card (NIC). However, the host machine translates between the VNIC and the NIC. As a result, the host machine can manage the network resources for multiple virtual machines.

When data is to be transmitted over a network from a remote machine to a local machine, the data is formatted by a protocol, e.g., Transmission Control Protocol (TCP), Remote Direct Memory Access over Converged Ethernet (RoCE), and/or other protocols known to a person having ordinary skill in the art. If the data does not fit into a packet defined by the protocol, the data is segmented into a plurality of packets, and the plurality of packets, also known as a stream, are transmitted. As known to a person having ordinary skill in the art, a packet stream comprises a sequence of packet originating from the same source address and destined to the same destination address.

At the local machine, the individually received packets must be reassembled. Some NICs allow for packets formatted by a certain protocol, e.g., TCP, to be reassembled at the NIC's hardware level, which is handled by a fixed number of statically assigned global reassembly contexts as known to a person having ordinary skill in the art. The context comprises a hardware resource, e.g., storage of information such as the destination IP address, TCP port number, TCP sequence, and other information known to a person having ordinary skill in the art. Consequently, the reassembly does not lend itself well to virtualization, where a reassembly is carried out by Virtual Network Interface Cards (VNIC), which can be dynamically created and destroyed.

Accordingly, there is a need in the art for an implementation of a virtual network interface for TCP reassembly, providing a solution to the above identified problems, as well as additional advantages evident to a person having ordinary skill in the art.

SUMMARY

In an aspect of the disclosure, an apparatus and a method for dynamically allocating contexts for Transmission Control Protocol reassembly according to appended independent claims is disclosed. Additional aspects are disclosed in the dependent claims.

BRIEF DESCRIPTION OF THE DRAWINGS

The foregoing aspects described herein will become more readily apparent by reference to the following description when taken in conjunction with the accompanying drawings wherein.

Figure 1A:
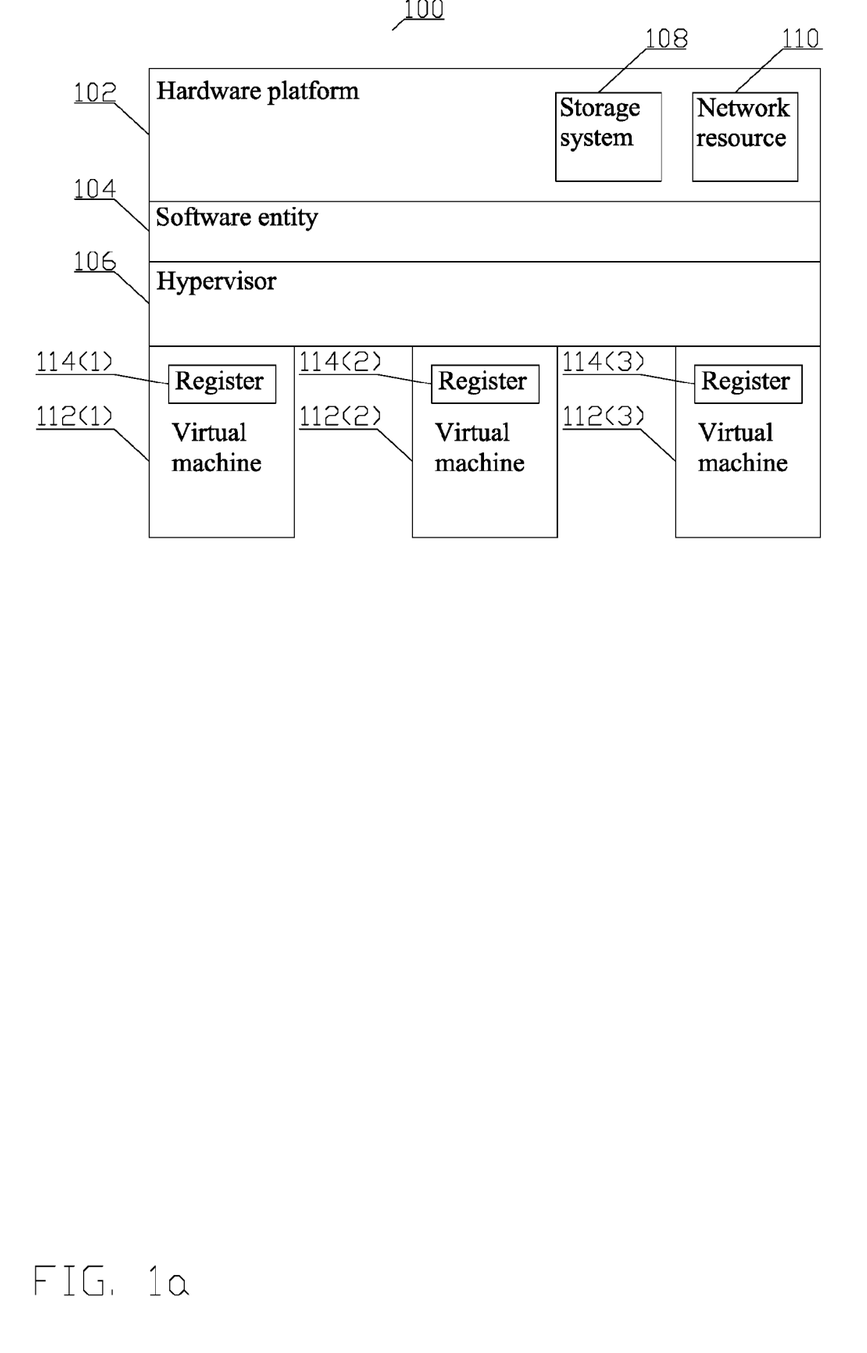
FIG. 1a depicts a conceptual structure of a virtualization system in accordance with an aspect of this disclosure.
Figure 1B:
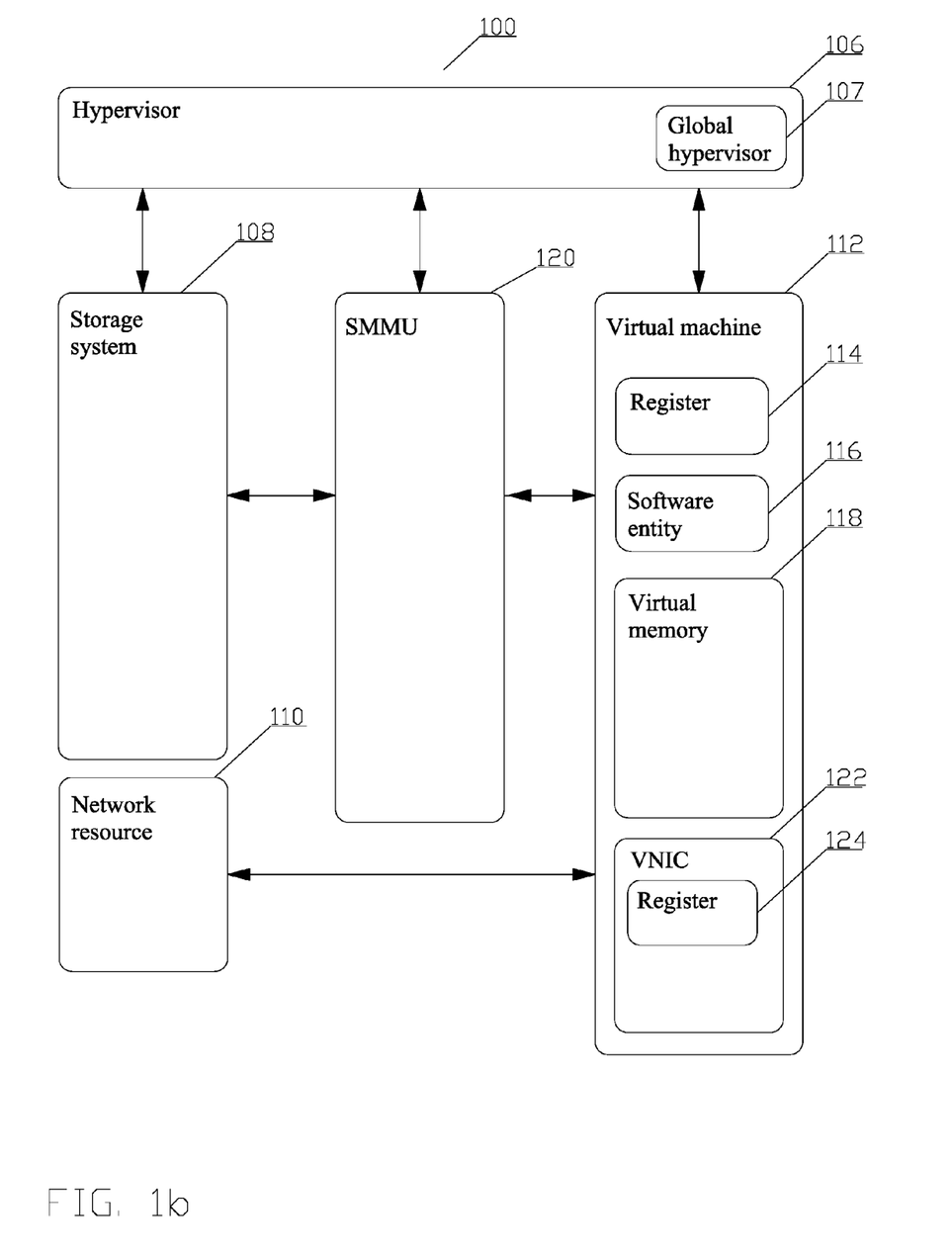
FIG. 1b depicts a more detailed view of the conceptual structure of the virtualization system in accordance with an aspect of this disclosure.
Figure 2:
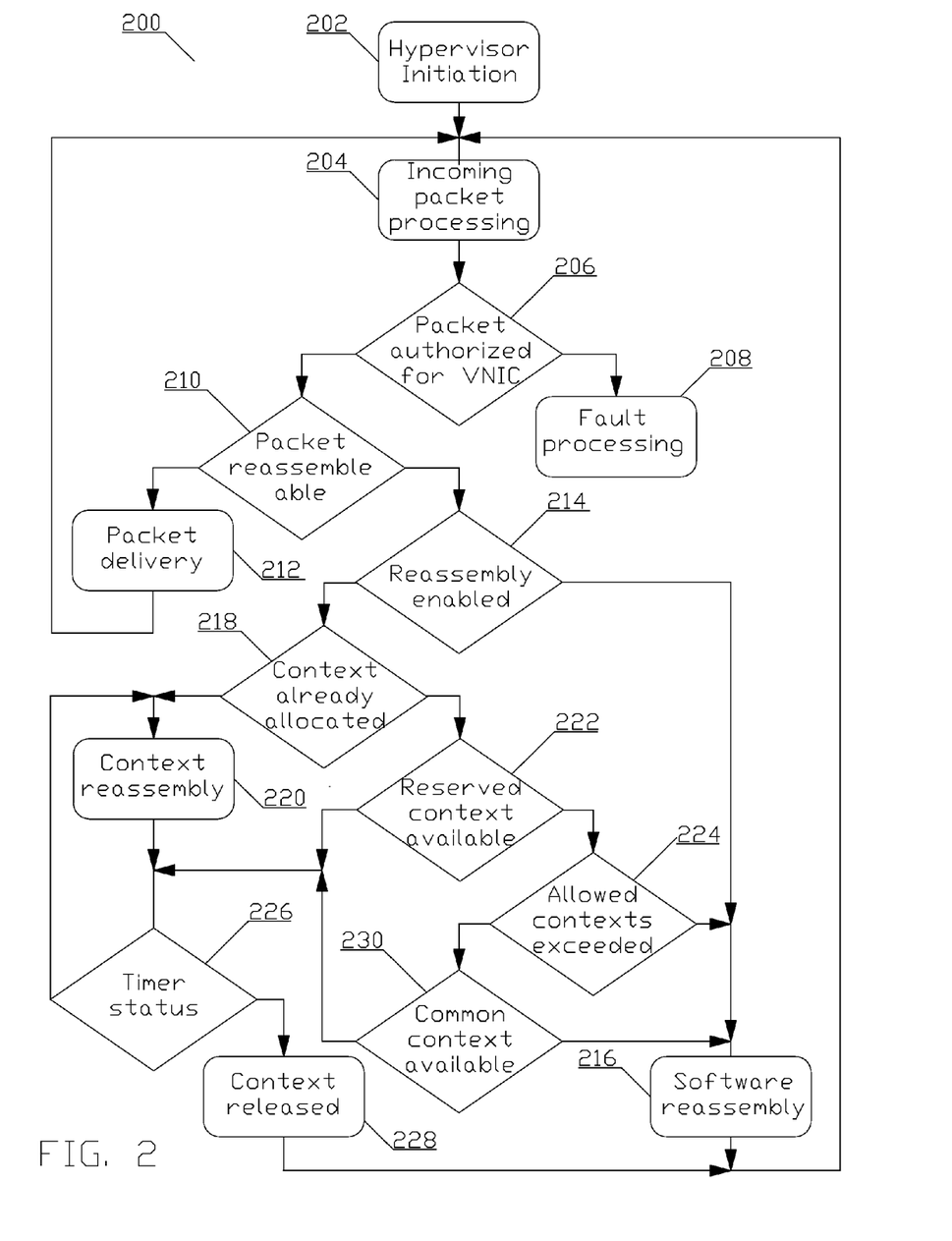
FIG. 2 depicts a flow chart of a process for Transmission Control Protocol packet reassembly.

The description of like structural elements among the figures, is not repeated, the like elements have reference numerals differing by an integer multiple of 100, i.e., reference numeral 102 in FIG. 1a, 1b, becomes reference numeral 202 in FIG. 2; unless differences and/or alternative aspects are explicitly noted. Any unreferenced double-arrow line indicates a possible information flow between the depicted entities.

DETAILED DESCRIPTION

Unless otherwise defined, all terms (including technical and scientific terms) used herein have the same meaning as commonly understood by a person having ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," an and the are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Various disclosed aspects may be illustrated with reference to one or more exemplary configurations. As used herein, the term "exemplary" means "serving as an example, instance, or illustration," and should not necessarily be construed as preferred or advantageous over other configurations disclosed herein.

Various aspects of the present invention will be described herein with reference to drawings that are schematic illustrations of conceptual configurations of the present invention, unless explicitly noted. The various aspects of this disclosure are provided to enable a person having ordinary skill in the art to practice the present invention. Modifications to various aspects of a presented throughout this disclosure will be readily apparent to a person having ordinary skill in the art, and the concepts disclosed herein may be extended to other applications.

FIG. 1a depicts a conceptual structure of a virtualization system 100 in accordance with an aspect of this disclosure. A hardware platform 102 together with an optional software entity 104, i.e., operating system, comprises a host machine operating a Type 2, also known as hosted hypervisor 106. As well known to a person having ordinary skill in the art, the optional software entity 104 is not necessary for Type 1 hypervisors, also known as native hypervisors. The aspects of the disclosure are equally applicable to both types of the hypervisor.

The hardware platform 102, comprises all physical entities embodying computing resources required by a specific host machine, i.e., a central processor unit, an input/output resources, a storage system, a network resource, and other resources known to a person having ordinary skill in the art. To avoid undue complexity, only a storage system 108, and a network resource 110 are shown. The storage system 108, may comprise a hard drive, a semiconductor based memory, and other types of memory known in the art. The network resource 110 comprises at least one NIC.

The hypervisor 106 creates and operates at least one virtual machine 112. Although three virtual machines 112 are shown, a person skilled in the art would understand that any number, including a single virtual machine, may exist. Parameters configuring operation of the virtual machine 112 are defined via structure 114. In an aspect, the structure 114 may comprise at least one register.

Referring to FIG. 1b, depicting a more detailed view of the conceptual structure of the virtualization system in accordance with an aspect of this disclosure, each of the virtual machines 112 operates a software entity 116. The software entity 116 may comprise at least one application, alternatively, the software entity 116 may comprise an operating system that operates the at least one application. Each of the virtual machines 112 may operates a different instance of the same software entity 116; alternatively, at least one virtual machine 112 may operates a different software entity 116.

A hypervisor 106, each virtual machine 112 and optionally each software entity 116 is further provided with a virtual memory 118. The virtual memory 118 may further be divided into a plurality of regions (not shown) allocated to different entities, i.e., the hypervisor, the VNIC(s), the application(s), and other entities known to persons having ordinary skill in the art. The virtual memory 118 accesses the storage system 108 on the host machine via a System Memory Management Unit (SMMU) 120.

Each virtual machine 112 is provided with a virtual network interface card (VNIC) 122 to enable communication with another virtual machine 112 via a virtual switch (not shown). The virtual switch may be implemented in the hypervisor 106 or in the NIC 110, as well known to a person skilled in the art. The disclosure is agnostic to a specific implementation. Additionally, the VNIC 122 further enables each virtual machine 112 to communicate with a different remote machine via the virtual switch and the NIC 110.

In accordance with below described aspects a structure and process for a TCP packet reassembly is disclosed that enable a hypervisor to dynamically allocate resources based on VNIC(s) resource needs, e.g., bandwidth ratios, while also preventing an overly active VNIC, i.e., a VNIC receiving many new TCP sessions, from using resources that may benefit performance of another VNIC, thus resulting in more consistent performance. In addition, the below disclosed TCP packet reassembly structure and process, which dynamically allocates all the available resources, saves hardware resources versus providing a constant number of TCP contexts per VNIC.

To accomplish the dynamic allocation of contexts for Transmission Control Protocol packet reassembly, a global common pool of fixed number of TCP contexts is shared across all of the VNICs. The hypervisor re-evaluates the VNICs' resource needs in accordance with a schedule, which may be fixed, i.e., occurring at pre-determined intervals, or flexible, triggered by an event. Such an event may comprise, e.g., creation of a VNIC, which requires a (re)allocation of TCP contexts to serve the newly created VNIC, destruction of a VNIC, which results in TCP contexts to be returned to the global common pool of TCP contexts, finishing TCP reassembly, and other events known to a person having ordinary skill in the art. The hypervisor then dynamically (re)allocates the TCP contexts to and from the global common pool to the VNICs according to the evaluation.

In an aspect, the allocation is controlled by the hypervisor setting two parameters for each VNIC; a reserved number of TCP context, and a maximum number of TCP contexts. The hypervisor may disable a VNIC from reassembly by setting the maximum number of TCP contexts to zero.

Figure 3:
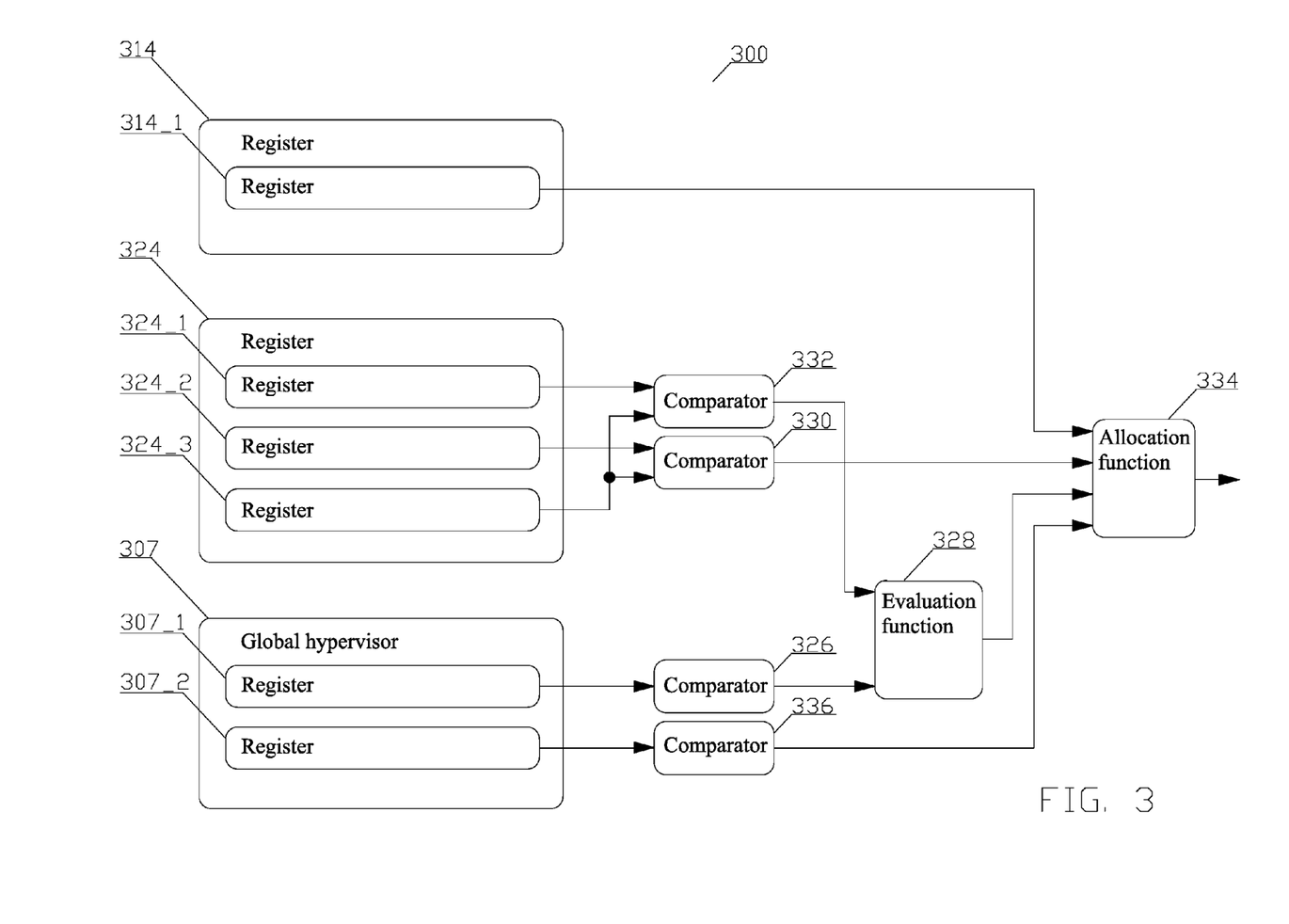
FIG. 3 depicts a conceptual structure and information flow among the elements of the structure enabling dynamically allocating contexts for Transmission Control Protocol packet reassembly.

FIG. 2 depicts a flow chart enabling the process for Transmission Control Protocol (TCP) packet reassembly. To further clarify the relationship between certain elements of the conceptual structure of a virtualization system 100 disclosed in greater details in FIG. 3 and associated text as referenced in FIG. 2, references of structural elements of FIG. 3, depicting a conceptual structure and information flow among the elements of the structure enabling the process, are in parenthesis.

In step 202, a hypervisor (not shown) initiates structures that configure a specific operation of the hypervisor, i.e., global hypervisor structure (307), of the NIC's (not shown), of the per-VNIC virtual machine, i.e., structures (314), and each of the VNICs, i.e., register (324).

The global hypervisor structure (307) may comprise a register (307_1) indicating the number of available common TCP contexts (CC), which comprises the global common pool of fixed number of TCP contexts minus the number of common pool of reserved TCP contexts, i.e., the sum of TCP contexts (HTR) reserved for each of the VNICs. In other words, the available common TCP contexts (CC) are the reminder the global common pool of fixed number of TCP contexts after the TCP contexts (HTR) were reserved for each of the VNICs. The available common TCP contexts (CC) are used to provide a TCP context, should a VNIC request a TCP context above the VNIC's reserved TCP context (HTR) but below the VNIC's maximum TCP context (HTM). Consequently, the reserved TCP contexts (HTR) are allocated so that one or more TCP contexts are left available in the common TCP contexts (CC).

The global hypervisor structure (307) may further comprise a register (307_2) indicating the number of TCP context buffers available (CA) comprising the global common pool of fixed number of TCP contexts minus the number of TCP context that have been allocated.

The per-VNIC virtual machine structure (314) may comprise a register (GRE) (314_1), a setting of which allows the virtual machine to enable or disable reassembly for the virtual machine's VNIC. A first value loaded by the virtual machine into the a register (314_1) appearing at the input of function (334) causes the function (334) to disallow TCP context allocation regardless of the state of other inputs; a second value loaded by the virtual machine into the register (314_1) enables the function (334) to evaluate the state of the other inputs to decide whether to allow or disallows TCP context allocation.

The per-VNIC structure (324) may comprise a register (324_1) indicating the maximum number of TCP contexts (HTM) that the VNIC is allowed to use, a register (324_2) indicating number of TCP context buffers (HTR) reserved for the use of the VNIC, and a register (324_3) indicating number of the TCP context (CTU) in use by the VNIC. By setting the register (324_1) indicating maximum number of TCP contexts to zero, the hypervisor may disable reassembly at a VNIC via the function (334) regardless of the state of other inputs. The processing continues in step 204.

In step 204, an incoming packet is received from a sending entity, e.g., an application at a local or a remote machine, and parsed in accordance with an implementation of the TCP. In accordance with parameters obtained from fields of the parsed packet, determination of a VNIC to process the packet is carried out. The parameters may comprise, e.g., a port at which the incoming packet was received, a destination MAC address, VLAN headers, a destination IP address, and other fields known to a person skilled in the art. The processing continues in step 206.

In step 206, the VNIC checks if the received packet is authorized for this VNIC. If the received packet is not authorized for this VNIC, the processing continues in step 208, otherwise, the processing continues in step 210.

In step 208, a fault indication may be created and reported to the VNIC that may elect from several actions, i.e., drop the packet, increment a hypervisor drop statistic, increment a guest drop statistic, cause a hypervisor interrupt, cause an interrupt at the software entity for which the packet is intended, create an event indicating the error, or any permutation of the above. Additionally, if the NIC is equipped with the ability to log information about the address that caused the fault recorded by the VNIC when the fault indication was detected, in some cases it is possible for the hypervisor to correct the error (such as bringing a page into memory) then asking the virtual machine to retry the operation from the point where the fault occurred.

In step 210, the VNIC accepts the packet and determines whether the packet comprises a reassemble able TCP packet. The reassemble able TCP packet is understood to comprise a TCP packet conforming to predetermined criteria. Such criteria may comprise e.g., a packet size, excluding certain packet types, e.g., a Transmission Control Protocol Synchronize (TCP SYN), User Datagram Protocol (UDP) Internet Control Message Protocol (ICMP), as well as any other not reassemble able, packets, and other criteria known to a person having ordinary skill in the art. If the packet is not reassemble able, the processing continues in step 212; otherwise the processing continues in step 214.

In step 212, the TCP packet is provided to the entity to which the packet is addressed, and the processing returns to step 204.

In step 214, the VNIC verifies, whether the TCP packet reassembly is enabled by the hypervisor setting maximum TCP context buffers (HTM) in register (324_1) greater than zero and that the virtual machine did not disable the reassembly by setting a first value in the register (GRE) (314_1). If the packet reassembly is disabled, the processing continues in step 216; otherwise, the processing continues in step 218.

In step 216, the TCP packet is not reassembled by the TCP context, and is passed to the VNIC's driver software, for a driver level reassembly, and the processing returns to step 204.

In step 218, the VNIC checks if TCP packet belongs to a stream for which a TCP context has already been allocated, and if so, the processing continues in step 220. Otherwise, the processing continues in step 222.

In step 220, the TCP packet is provided to the allocated TCP context, where the TCP packet is reassembled with the previously received TCP packet. The processing continues in step 226.

In step 222, the register (324_3), containing the number of the TCP contexts (CTU) in use, is compared with the register (324_2), containing the number of the reserved TCP contexts (HTR), by comparator 330. If the comparator 330 indicates that the number of the TCP contexts CTU is less than the number of the reserved TCP contexts HTR, it follows that a reserved TCP context for the VNIC is available. Consequently, the hypervisor allows the VNIC to allocate a reserved TCP context via function (334), the NIC decrements register (307_2) containing the number of available TCP contexts (CA), and increments register (324_3) containing number of TCP context in use (CTU). The processing continues in step 226; otherwise the processing continues in step 224.

In step 226, the VNIC starts a timer that counts a predetermined period of time and waits for a predetermined period of time for a potential subsequent packet. In an aspect, the predetermined period of time is configured by the hypervisor separately for each VNIC in step 202 supra. In another aspect, the predetermined period of time is configured by the hypervisor as a global value valid for each VNIC in step 202 supra. If the subsequent reassemble able TCP packet is not received within the predetermined period of time the processing continues to step 228; alternatively; otherwise the processing continues in step 220.

In step 224, the register (324_3), containing the number of TCP contexts (CTU) used, is compared with the register (324_1), containing the number of maximum TCP contexts (HTM) by comparator (332). If the comparator (332) indicates that the number of TCP contexts in use CTU is less than the number of maximum TCP context HTM, the evaluation function (328) awaits information from comparator (326), and the processing continues in step 230; otherwise evaluation function (328), regardless of the information from comparator (326), via the allocation function (334) disables allocation of a TCP context, and the processing continues in step 216.

In step 230, the hypervisor determines in block (3246) whether register (307_1) containing the number of common TCP contexts (CC) is greater than zero. If the determination is positive, it follows that common TCP contexts (CC) is available. Consequently, the hypervisor allows the VNIC to allocate a TCP context via the evaluation function (328) and the function (334). The NIC decrements register (307_1), containing the number of available common TCP contexts (CC), and increments register (324_3), containing number of TCP context in use (CTU). The processing continues in step 226. Otherwise no more common TCP context (CC) is available; consequently, the hypervisor disallows the VNIC to allocate a TCP context via the evaluation function (328) and the function (334). The processing continues in step 216.

In step 228, the VNIC finishes packet processing, a TCP context buffer is freed; consequently, NIC increments register (307_2) containing the number of available TCP context (CA), decrements register (324_3) containing number of TCP context in use (CTU), and if register (324_3) containing number of TCP context (CTU) before decrementing is greater or equal to the register (324_2) containing number of the reserved TCP context (HTR) then register (307_1) containing the number of common TCP context (CC) is incremented.

During a regular process for Transmission Control Protocol (TCP) packet reassembly disclosed in FIG. 2 supra, the register (307_2) is not utilized, because the dynamic allocation of the TCP contexts, and especially preventing an overly active VNIC to utilize resources using resources that may benefit performance of another VNIC, is fully controlled by the register (307_1) indicating the number of available common TCP contexts (CC) and the register (324_1), containing the number of maximum TCP context (HTM).

However, during the time a VNIC is in the process of being shut-down by the hypervisor, the hypervisor is setting the VNIC's register indicating the maximum number of TCP contexts (HTM) that the VNIC is allowed to use and the register indicating number of TCP context (HTR) reserved for the use of the VNIC is set to zero. Because the setting of the VNIC's registers further affects setting at least the register 307_2 containing the number of available TCP context (CA) and the register 307_1 containing the number of common TCP context (CC), a condition causing the latter register to not be greater than zero may occur. If such a condition is detected by a comparator 336, the hypervisor may disable any TCP context allocation via function 334 to properly account for a change in all the TCP context registers affected by the VNIC's shut-down and to prevent a miss-assignment of the TCP contexts assigned to the VNIC being shut-down to another VNIC requesting TCP context. Once the accounting is finished, the hypervisor re-enables the TCP context allocation via function 334.

The various aspects of this disclosure are provided to enable a person having ordinary skill in the art to practice the present invention. Various modifications to these aspects will be readily apparent to persons of ordinary skill in the art, and the concepts disclosed therein may be applied to other aspects without departing from the spirit or scope of the invention. Thus, the present invention is not intended to be limited to the aspects shown herein but is to be accorded the widest scope consistent with the principles and novel features disclosed herein.

Therefore, by means of an example a person having ordinary skill in the art will understand, that the flow chart is not exhaustive because certain steps may be added or be unnecessary and/or may be carried out in parallel based on a particular implementation. By means of an example, although steps 222 through 230 disclosing evaluation of an output of evaluation function 328 were described as sequential, the steps may be carried out in parallel. Additionally, the sequence of the steps may be re-arranged as long as the re-arrangement does not result in functional difference. By means of an example, the sequence of steps 210 and 214 may be changed.

All structural and functional equivalents to the various illustrative logical blocks, modules, circuits, and algorithm steps described in connection with the various aspects described throughout this disclosure that are known or later come to be known to those of ordinary skill in the art are expressly incorporated herein by reference and are intended to be encompassed by the claims. Such illustrative logical blocks, modules, circuits, and algorithm steps may be implemented as electronic hardware, computer software, or combinations of both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for dynamically allocating context for Transmission Control Protocol (TCP) reassembly, comprising:
    providing a fixed plurality of global common TCP contexts;
    reserving for each of one or more virtual network interface card(s) one or more TCP context(s) out of the fixed plurality of the global common TCP contexts, leaving a reminder of the fixed plurality of the global common TCP contexts comprising one or more contexts; and
    allocating to a virtual network interface card from the one or more virtual network interface card(s) a TCP context from the reserved one or more TCP contexts when a reassemble able TCP packet is received by the virtual network interface card.

2. The method as claimed in claim 1, wherein the reserving for each of one or more virtual network interface card one or more TCP context(s), comprises:
    determining for each of the one or more virtual network interface card(s) resource needs; and
    reserving for each of the one or more virtual network interface card(s) one or more TCP context(s) in accordance with the resource needs.

3. The method as claimed in claim 2, wherein the determining for each of the one or more each virtual network interface card(s) resource needs, comprises:
    determining for each of the one or more virtual network interface card(s) resource needs in accordance with a schedule.

4. The method as claimed in claim 3, wherein the schedule is fixed.

5. The method as claimed in claim 3, wherein the schedule is flexible.

6. The method as claimed in claim 1, further comprising:
    determining whether a TCP context allocation is disabled by a hypervisor during a virtual network interface card shut-down; and
    declining the allocating when the determining is positive.

7. The method as claimed in claim 6, further comprising:
    carrying out the allocating when the determining is negative.

8. The method as claimed in claim 1, further comprising:
    releasing by the virtual network interface card the allocated reserved TCP context when a reassembly is finished.

9. The method as claimed in claim 1, further comprising:
    allocating to the virtual network interface card an additional TCP context from the reminder of the fixed plurality of global common TCP contexts when a reassemble able TCP packet is received by the virtual network interface card, provided that
- all of the reserved one or more TCP contexts were allocated;
- less than a maximum number of TCP contexts that the virtual network interface card is allowed to use were allocated; and
- at least one TCP context in the reminder of the global common TCP contexts is available.

10. The method as claimed in claim 1, further comprising:
declining to allocate to the virtual network interface card an additional TCP context from the reminder of the global common TCP contexts when the reassemble able TCP packet is received by the virtual network interface card provided that
- more than the maximum number of TCP contexts that the virtual network interface card is allowed to use were allocated.

11. The method as claimed in claim 9, further comprising:
releasing by the virtual network interface card the allocated TCP context to the reminder of the global common TCP contexts when a reassembly is finished.

12. An apparatus for dynamically allocating context for Transmission Control Protocol (TCP) reassembly, comprising:
- a network interface earth providing a fixed plurality of global common TCP contexts; and
- a hypervisor executing on a hardware platform comprising a central processor unit, configured
  - to reserve for each of one or more virtual network interface card(s) one or more TCP context(s) out of the fixed plurality of the global common TCP contexts, leaving a reminder of the global common TCP contexts comprising one or more contexts, and
  - to allocate to a virtual network interface card from the one or more virtual network interface card(s) a TCP context from the reserved one or more TCP contexts when a reassemble able TCP packet is received by the virtual network interface card.

13. The apparatus as claimed in claim 12, wherein the hypervisor is configured
- to determine for each of the one or more virtual network interface card(s) resource needs; and
- to reserve for each of the one or more virtual network interface card(s) one or more TCP context(s) in accordance with the resource needs.

14. The apparatus as claimed in claim 13, wherein the hypervisor is configured to determine for each of the one or more virtual network interface card(s) resource needs in accordance with a schedule.

15. The apparatus as claimed in claim 14, wherein the schedule is fixed.

16. The apparatus as claimed in claim 14, wherein the schedule is flexible.

17. The apparatus as claimed in claim 12, wherein the hypervisor is further configured to disable a TCP context allocation during a virtual network interface card shut-down.

18. The apparatus as claimed in claim 12, wherein the virtual network interface card is configured to release the allocated reserved TCP context when a reassembly is finished.

19. The apparatus as claimed in claim 12, wherein the hypervisor is configured to allocate to the virtual network interface card an additional TCP context from the reminder of the global common TCP contexts when an reassemble able TCP packet is received by the virtual network interface card, provided that
- all of the reserved one or more TCP contexts were allocated;
- less than a maximum number of TCP contexts that the virtual network interface card is allowed to use were allocated; and
- at least one TCP context in the reminder of the global common TCP contexts is available.

20. The apparatus as claimed in claim 19, wherein the hypervisor is configured to decline to allocate to the virtual network interface card an additional TCP context from the reminder of the global common TCP contexts when the reassemble able TCP packet is received by the virtual network interface card provided that
- more than the maximum number of TCP contexts that the virtual network interface card is allowed to use were allocated.

21. The apparatus as claimed in claim 19, wherein the virtual network interface card is configured to release the TCP context to the reminder of the global common TCP contexts when a reassembly is finished.

* * * * *